H. B. DAY.
AUTOMOBILE SURFACING.
APPLICATION FILED APR. 21, 1919.
1,392,889.
Patented Oct. 4, 1921.
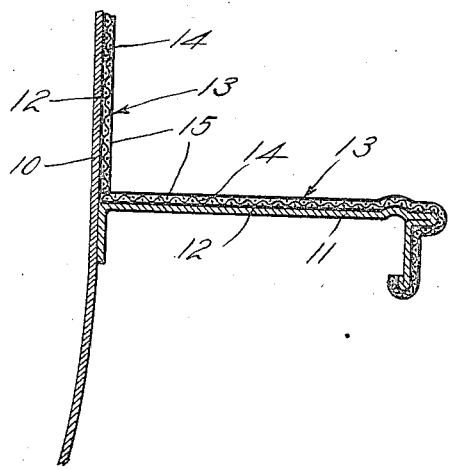
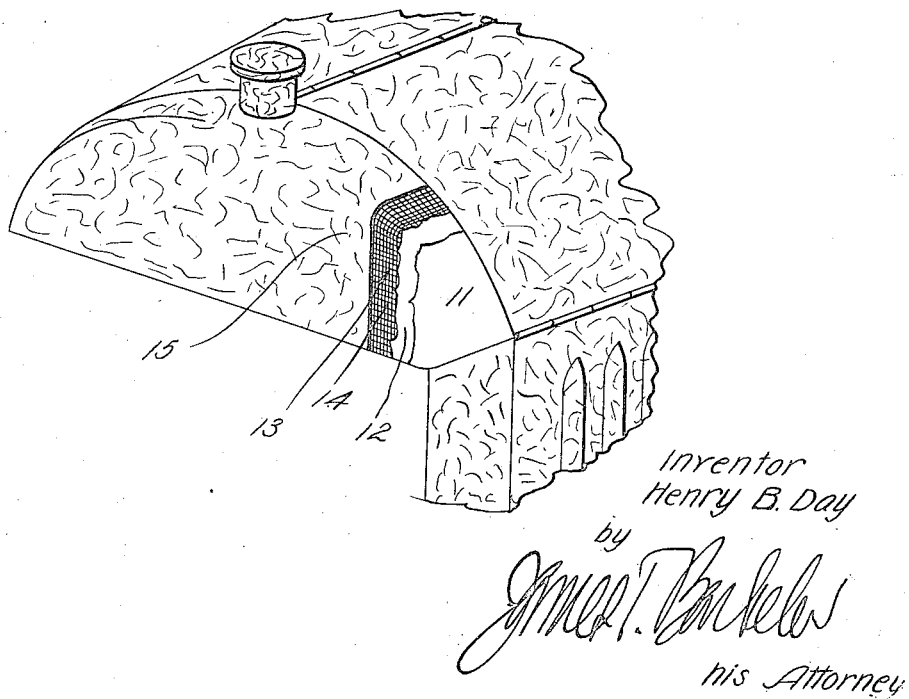
Inventor
Henry B. Day
by
his Attorney

UNITED STATES PATENT OFFICE.

HENRY B. DAY, OF LOS ANGELES, CALIFORNIA.

AUTOMOBILE-SURFACING.

1,392,889.  Specification of Letters Patent.  Patented Oct. 4, 1921.

Application filed April 21, 1919. Serial No. 291,740.

*To all whom it may concern:*

Be it known that I, HENRY B. DAY, a citizen of the United States, residing at Los Angeles, in the county of Los Angeles, State of California, have invented new and useful Improvements in Automobile-Surfacing, of which the following is a specification.

This invention relates to the surfacing of such things as automobiles, automobile bodies, hoods, fenders, and, in general, all of those parts of automobiles and other road vehicles or the like which are now finished with painted or varnished surfaces. It is a general object of this invention to provide a hard, practically impervious surfacing for automobiles or the like which may easily be applied to existing body structures, be durable and of pleasing appearance, and which will maintain an attractive surface practically unaffected by the attacks of moisture and dirt.

It is today, and has been in the past, the universal custom to surface automobiles and other vehicles with coats of paint and varnish, etc. This method of surfacing an automobile always has been comparatively expensive and requires a long time to properly execute; and the result at best has only been a surface which is good and of first rate appearance for a short time. Such surfaces are notoriously short lived, being subject to very rapid deterioration by untoward weather conditions, and furthermore they require a very great deal of labor in order to keep them in proper condition. And, furthermore, the use of soaps or other cleaning compounds on such a painted and varnished surface is usually injurious to the surface and quickly works its decay and deterioration. It is usually possible to keep the original highly-polished surface for a short time only, and thereafter the surface has a dingy discolored appearance which can only be effectually remedied by removing the old finish and applying an entirely new one.

It is an object of this invention to overcome these difficulties and to provide an automobile or the like with a surface which is easily applied and has a long life, keeps its pristine elegance of appearance comparatively indefinitely, and is easily and simply cleaned without being deteriorated by the cleaning operation. Other objects and accomplishments of the invention will appear from the following description in which I set forth a preferred form of my invention. It will be understood, however, that this specific description of a preferred form is made, not for the purpose of limiting the invention but for the purpose of rendering the invention fully and clearly intelligible to those skilled in the art.

I have discovered that an automobile or the like may be surfaced with a flexible material of the character hereinafter described, cemented or otherwise secured to the body and other parts of the automobile. Such a fabric may be supplied with a suitable water- oil- and dust-proof surface either after the fabric has been applied to the machine or before such application. As an instance of the first mentioned procedure, I may apply a suitable grade of fabric to the parts of the machine desired to be covered, and then I may apply a suitable paint or similar substance to the surface of the fabric. As a general instance of the latter mode of procedure, I may use a fabric which has been previously impregnated or surfaced with a water- oil- and dust-proof material, such as a cellulose ester, so that a covering unaffected by the elements, attractive in appearance and completely protective of the metal parts, upon which it is laid, is provided. In either case the exterior color may be made anything desired; and where previously prepared fabrics are used, those fabrics may be not only colored, but also embossed, mottled in design, or otherwise decorated, to suit the desire or fancy of any person.

It is a particular excellency of my surfacing that it lends itself with equal readiness to a relatively inexpensive job or to a relatively fine and expensive job. For instance: where a strong and durable protective surfacing is desired, inexpensively, a coarse grade of canvas or similar material may be used as a fabric, and this material may then have applied to it a coat or a suitable number of coats of a suitable paint or varnish, or any other substance which will render the canvas impervious and preferably impervious to water, oil, grease and dirt, and, furthermore, smooth and free from any dirt or dust retaining fibers or the like. It will be borne in mind that the painting of such a fabric is much easier and far less expensive than the painting of a smooth metal surface—far less care is necessary in painting the fabric and a good protective surfacing is made with only a few coats of paint on account of the greater receptive quality of the fabric; whereas, when paint is originally applied to the metal surfacing itself, a great many carefully laid coats are necessary and numerous rub-downs are essential, before a complete job is secured.

On the other hand, for finer and costlier jobs, I may utilize fabric or the like of any fineness of texture, or other qualities to suit individual preferences and the exterior finish on that fabric may be of the finest grade if so desired, although even under these circumstances the work of finishing is simplified over that of painting and finishing the metal direct.

It is an excellency of my invention, in whatever form it is applied, that it is quickly and easily applied to an automobile or the like, requiring a few days at the most; whereas a good painting job has required thirty days or more, and has also required very exacting conditions, free from dust, etc. My surfacing may be applied in any situation.

In order to fully explain my invention I illustrate a typical form thereof in the accompanying drawings. Figure 1 is a section illustrating how my surfacing may be applied, for instance, to a fender and the side of the body; and Fig. 2 is a perspective showing the application of the surfacing to a radiator and hood, parts being broken away to show the structure of the surfacing.

As an example of the specific form which I now consider to be a preferable one, I will state the following: I first preferably clean the metal surface of the automobile body 10 and other parts 11, removing the paint or any coating or deposit which may be present, so as to clean the surface down to a smooth metal surface free from any coating or deposit which will readily take and uniformly retain a suitable glue or varnish, or other adhesive as indicated at 12. Having prepared the flexible material to the proper patterns, I then apply the flexible material 13 before the adhesive has time to dry; the flexible material being stretched during its application, if not before, to conform closely and smoothly to the contours of the metal surfaces, so that the flexible material lies preferably tightly and snugly against the metal. I prefer to use an adhesive of a type which hardens or sets by drying, rather than by cooling, although I do not limit myself to such an adhesive. The drying adhesive, however, has the advantage that it will not be softened by the heat of the engine or radiator; and this drying adhesive is of course protected from moisture by the waterproof quality of the flexible material. It will be obvious that an adhesive of this character is essential wherever the parts are subjected to a relatively high temperature in order that danger of loosening and sloughing off of the material may be eliminated.

The flexible material may comprise the fabric 14, and the exterior coat 15 may either be put on after the fabric is laid, (as by painting it on, etc.,) or the coat 15 may be on or impregnated in the fabric before laying the flexible material.

The flexible material which I now prefer to use, although the invention is not at all limited to such a material, is one which has been previously impregnated or surfaced with a water, oil and dust proof material as indicated at 15, preferably flexible and elastic so as to conform well. Such material can be had upon the market and one form which I use is a fabric 14 impregnated or surfaced with a cellulose ester, such as a cellulose acetate or cellulose nitrate—a material known upon the market as fabrikoid, I have found to be a good material for this purpose, this being a fabric surfaced with an adherent layer of nitrocellulose which is colored or colored and embossed in any suitable manner, usually in simulation of leather or similar material. Such a flexible prepared fabric I have found to be easily and efficiently applied in the manner I have herein described; and such a material may be easily applied not only to the body but to the hood radiator, fenders and other parts of an automobile, being flexible so that it may be fitted easily to the angles and curves of the parts in applying it, but which, when once in place, forms a hard, practically impervious skin which will completely protect the metal parts and which itself is practically unaffected by the elements and is of such character that it may be readily washed and cleaned in the same manner in which painted surfaces are cleaned.

An automobile provided with my improved surfacing has a very pleasing appearance and it has the particular excellence of keeping its pristine appearance for a very long time. It is very easily cleaned, and does not require the use of cleaning compounds or polishers, or anything of such nature, but only requires a simple wiping with a dry cloth. By such simple wiping, mud, dust and water, grease and oil, may be removed without any appreciable injury to the surface. This is a very great distinction over the method of cleaning necessary on painted surfaces, where a great deal of care must be used to remove the foreign material without injury to the finish. The heat of the engine has no injurious effect upon my surfacing applied to the hood or to the radiator; and water and dust have no injurious effect upon it. Thus, in contradistinction to an ordinary automobile finish where the hood, for instance, loses its pristine elegance very quickly, my improved surfacing retains its uniform appearance at all times.

I have proceeded to a detailed and specific description of my invention, not for the purpose of limiting the invention to the particular things here set forth, but for the purpose of rendering my invention clearly intelligible to those skilled in the art; believing my invention to be broad in its character and scope, rather than limited; and imposing no limitation upon my invention except those which are expressly stated in the following claims, which are meant to be read and interpreted broadly, as well as specifically.

Having thus described a preferred form which my invention may take, I claim:

1. A composite automobile body, comprising a metal base; and an exterior covering of normally flexible material fitted and cemented to said metal base over substantially the entire contacting area, to form, when in position, a rigid, protective outer layer impervious to moisture and capable of taking finishing color coats.

2. A composite automobile body part, comprising a sheet metal base; and an exterior covering of normally flexible material having a fibrous cement-receiving under surface and a hard outer skin, fitted and cemented to said metal base over substantially the entire contacting area, to form, when in position, a rigid, protective outer layer impervious to moisture and capable of taking finishing color coats.

3. A composite sheet suitable for automobile body work; comprising a metal base having cemented to its surface with a drying, heat-immune cement, a normally flexible material having a fibrous cement-receiving surface to contact with said metal base, and a hard outer skin, to form, when combined with said base, a rigid, protective layer impervious to moisture and capable of taking finishing color coats.

4. A composite sheet suitable for automobile body work, comprising a metal base having cemented thereto a covering of normally flexible material, the metal contacting face of which is fibrous to provide a cement-receiving surface, and the outer face of which is provided with a coating of cellulose ester, to form a rigid, protective layer impervious to moisture and capable of taking finishing color coats.

In witness that I claim the foregoing I have hereunto subscribed my name this 13th day of March, 1919.

HENRY B. DAY.

Witness:
VIRGINIA I. BERINGER.